US008981595B2

(12) United States Patent
Bairanzade

(10) Patent No.: US 8,981,595 B2
(45) Date of Patent: Mar. 17, 2015

(54) METHOD OF FORMING A POWER SUPPLY CONTROLLER AND SYSTEM THEREFOR

(75) Inventor: Michael Bairanzade, Tournefeuille (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 593 days.

(21) Appl. No.: 13/388,183

(22) PCT Filed: Sep. 10, 2009

(86) PCT No.: PCT/US2009/056483
§ 371 (c)(1),
(2), (4) Date: Jan. 31, 2012

(87) PCT Pub. No.: WO2011/031262
PCT Pub. Date: Mar. 17, 2011

(65) Prior Publication Data

US 2012/0133206 A1 May 31, 2012

(51) Int. Cl.
*H02J 1/10* (2006.01)
*H05B 35/00* (2006.01)

(52) U.S. Cl.
CPC ..................................... *H05B 35/00* (2013.01)
USPC ............... 307/43; 349/42; 315/182; 395/282; 395/283

(58) Field of Classification Search
CPC ....................................................... H05B 35/00
USPC ........................................................... 307/43
See application file for complete search history.

(56) References Cited

U.S. PATENT DOCUMENTS

2009/0040794 A1 * 2/2009 Williams .................. 363/21.14

FOREIGN PATENT DOCUMENTS

| | | |
|---|---|---|
| JP | 08-317649 | 11/1996 |
| JP | 11-215822 | 8/1999 |
| JP | 2003-189620 | 7/2003 |
| JP | 2008-286935 | 11/2008 |

* cited by examiner

*Primary Examiner* — Rexford Barnie
*Assistant Examiner* — Toan Vu
(74) *Attorney, Agent, or Firm* — Robert F. Hightower

(57) ABSTRACT

In one embodiment a power supply is configured to reuse a single power supply controller to regulate two different output voltages to two voltages including two different voltage values.

15 Claims, 4 Drawing Sheets

70

METHOD OF FORMING A POWER SUPPLY CONTROLLER AND SYSTEM THEREFOR

BACKGROUND OF THE INVENTION

The present invention relates, in general, to electronics, and more particularly, to power supply controllers including semiconductors devices for power supplies and methods of forming such semiconductor devices.

In the past, the electronics industry utilized various methods and structures to form an illumination system for image capturing devices such as still image cameras and motion video cameras. Advances in digital technology allowed merging of still image capturing and motion video capturing into a single image capturing device. For example, cellular telephones progressed to include the ability to capture a single image as a still picture or to capture continuous motion has a movie or motion video. In order to provide the ability to operate in low light situations, these image capturing devices also included a method of illuminating the subject to be captured. A xenon light source generally was utilized to provide a pulsed flash in order to capture a single still image. A xenon light source was used because the xenon light source provided a high intensity light. However, the xenon light source was not suitable for continuous illumination that was required for continuous motion video. As a result, a second light source, typically a light emitting diode (LED), was used to provide a continuous light source for the continuous motion video.

The xenon light source required a high voltage pulse, typically about two hundred fifty to three hundred twenty volts (250-320 V), in order to energize the xenon light source to produce a pulse or flash of light. Conversely, the LED utilized a lower voltage source that can be supplied for a longer period of time. Consequently, the still image section included a complete power supply to operate the xenon light source and the video section included another complete power supply to operate the LED. As a result, the illumination system usually included a complete power supply including a switching power supply controller and an inductor, such as a transformer, for the still image section and another complete power supply including another switching power supply controller and another inductor, such as another transformer, for the video section. Having two complete power supply systems with two power supply controllers and two inductors increased the cost of the image capturing device.

Accordingly is desirable to have a power supply system for the illumination section of an image capturing device that does not require two inductors or two transformers, that does not required two separate switching power supply controllers, and that has a lower cost.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. It will be appreciated by those skilled in the art that the words during, while, and when as used herein relating to circuit operation are not exact terms that mean an action takes place instantly upon an initiating action but that there may be some small but reasonable delay, such as a propagation delay, between the reaction that is initiated by the initial action. The use of the word approximately or substantially means that a value of an element has a parameter that is expected to be very close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described.

DETAILED DESCRIPTION OF THE DRAWINGS

Figure 1:
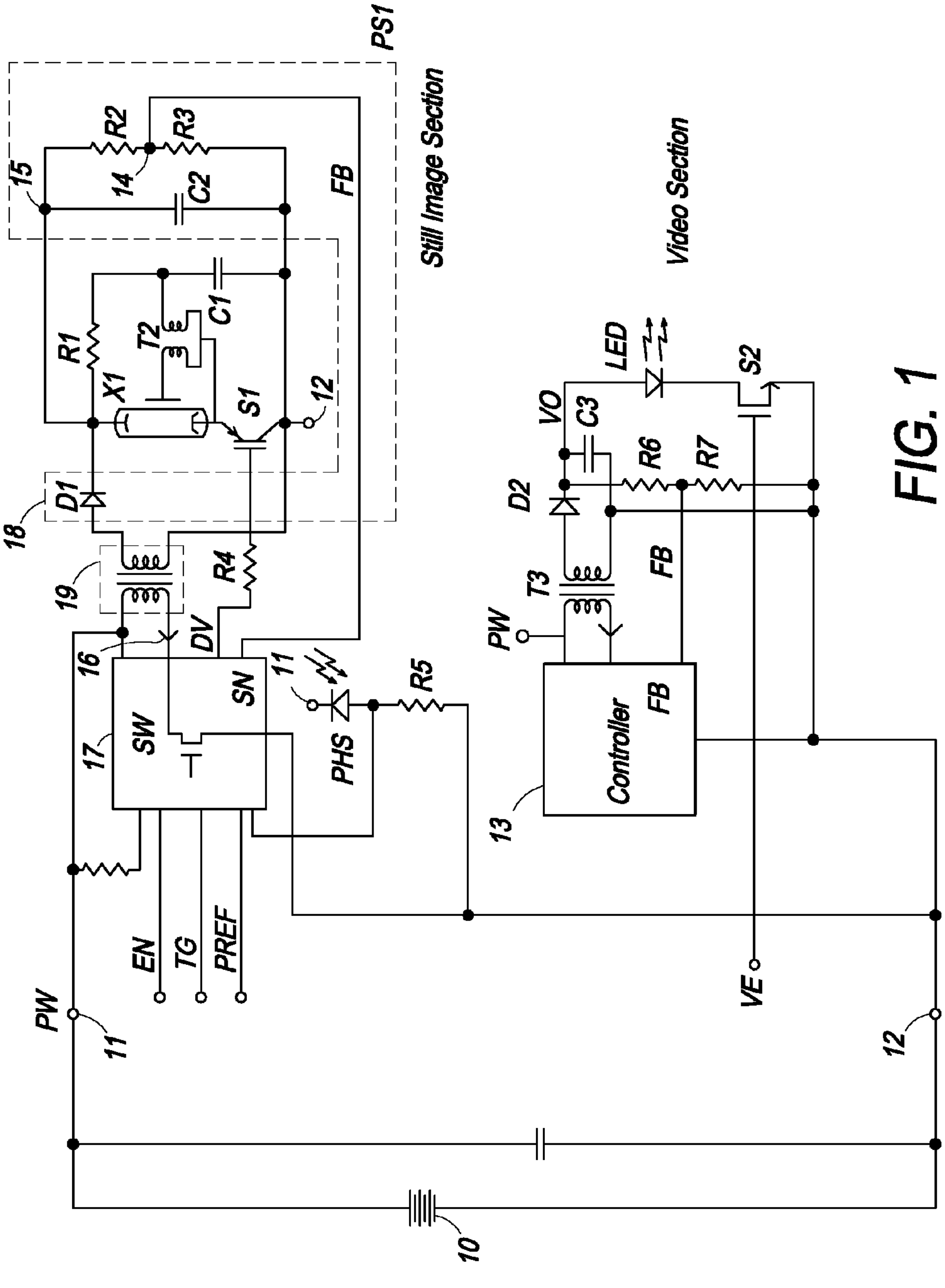
FIG. 1 Prior Art
FIG. 1 schematically illustrates an embodiment of a typical prior art power supply system.

An example of a typical prior art power supply for an illumination system of an image capturing device is illustrated in FIG. 1. The power supply generally includes a still image section that supplies power to generate a flash to capture a single image (PS1) and also includes a video section that supplies power to illuminate the subject for continuous motion video capture. The still image section includes a switching power supply controller 17, an inductor, such as a transformer 19, a xenon light source (X1), and a high voltage discharge circuit for the xenon light source (X1) which includes a transformer T2, a capacitor C1, and an insulated gate bipolar transistor (IGBT) S1. Output stage 18 is utilized to form a regulated output voltage on an output 15. Output stage 18 usually includes a rectifier, such as a diode D1, a storage element, such as an output capacitor C2, that stores the average value of the voltage from diode D1, and a feedback network, such as series connected resistors R2 and R3. A photo sensor (PHS) may be used in the still image section to sense the light from the xenon light source (X1), such as sensing light in order to determine the distance to a subject in order to set the focus of a camera.

Controller 17 may also include control logic that was responsive to control signal inputs such as an enable signal (EN), a trigger signal (TG), and a pre-flash (PREF) signal. When the enable (EN) signal is active, controller 17 operates an internal switch (SW) to control a current 16 through an inductor, such is the inductor of the primary side of transformer 19, in order to regulate an output voltage at output 15 of the power supply. The operation of the switch (SW) is controlled in response to a feedback signal (FB) that is received at a sense signal input (SN) of controller 17. The feedback network of output stage 18 is connected to output 15 in order to form the feedback signal at a node 14 to be representative of the value of the output voltage formed at output 15. As illustrated in FIG. 1, the feedback network includes the resistor divider of resistors R2 and R3. However, those skilled in the art will appreciate that the feedback network may be any other well-known circuitry used to provide a feedback signal that is representative of an output voltage. For the embodiment illustrated in FIG. 1, the inductor through which current 16 flows is a primary side inductor of transformer 19. In other embodiments, the inductor may be a separate single inductor instead of a portion of a transformer. As is well known to those skilled in the art, switching power supply controller 17 controls the switching of the internal switch transistor and forms current 16 as required to maintain the voltage at output 15 to a target value within a range of values around the target value. For example, the target value may be fifteen volts (15V) and the range of values may be plus or minus five percent (5%) around the fifteen volts.

The power supply for the video section includes a switching power supply controller 13 and an inductor. For the embodiment that is illustrated in FIG. 1, the inductor is a primary inductor of a transformer T3. Controller 13 regulates an output voltage at node OV in response to another feedback signal that is representative of the output voltage at node OV. Controller 13 may be similar to controller 17. A feedback network, for example a feedback network of resistors R6 and R7, forms a feedback signal that is representative of the value of the output voltage. Controller 13 receives the feedback signal and controls current through the inductor in order to regulate the value of the output voltage. A rectifier, such as a diode D2, rectifies the voltage from the inductor and an average value of the voltage is stored on an output capacitor C3. A video enable (VE) control signal is used to enable a transistor S2 and cause the LED to emit light. As seen in FIG. 1, controllers 17 and 13 operate independently of each other.

Figure 2:
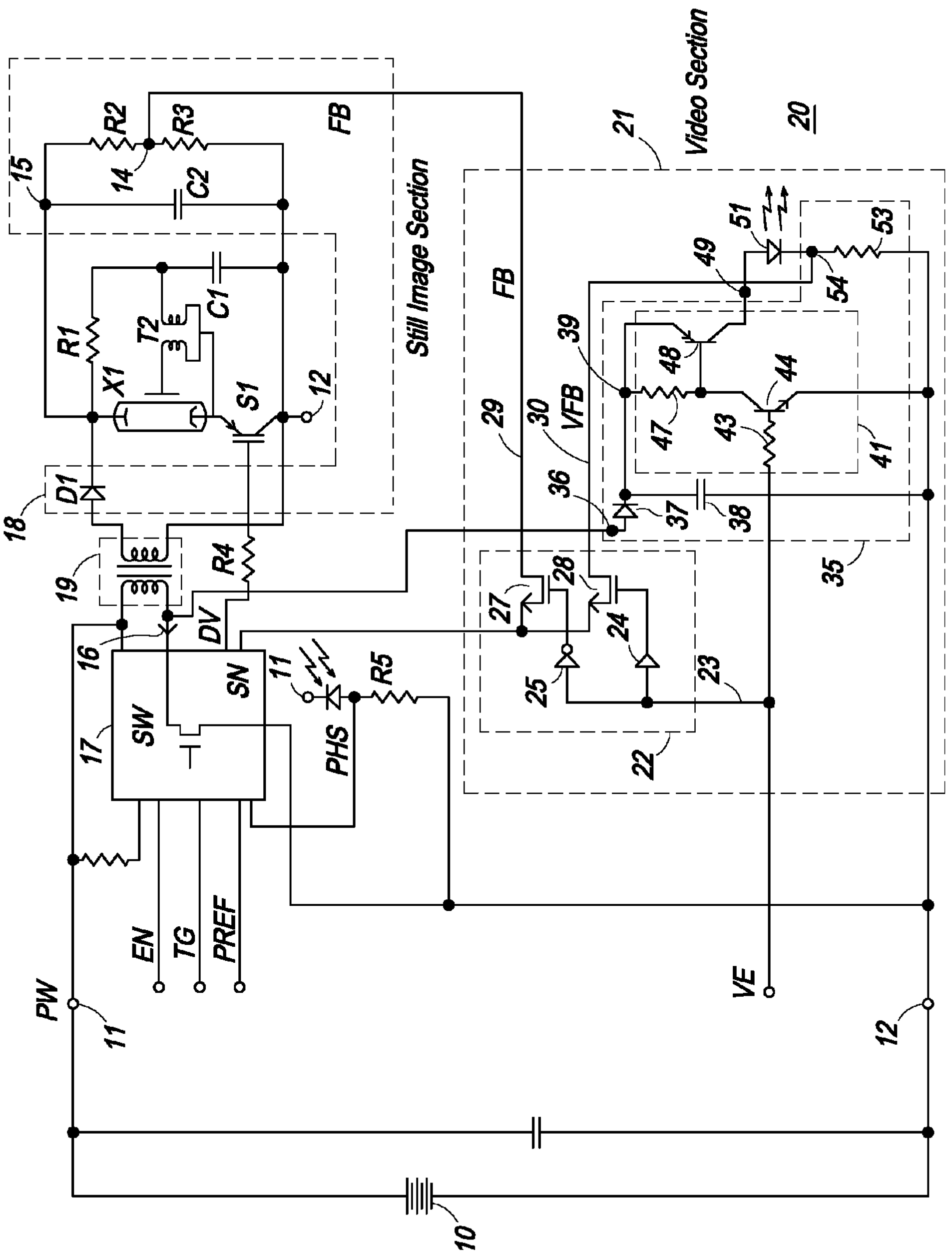
FIG. 2 schematically illustrates an exemplary embodiment of a portion of a power supply system for an illumination system of an image capturing device in accordance with the present invention.

FIG. 2 schematically illustrates an exemplary embodiment of a portion of a power supply system 20 for an illumination system of an image capturing device. System 20 includes a still image section that is similar to the still image section of FIG. 1, however, the still image section of system 20 does not connect the feedback signal (FB) from node 14 directly to the sense signal (SN) of controller 17.

System 20 also includes a video section 21. Section 21 does not include a switching power supply controller or an inductor or transformer but reuses the switching power supply controller and inductor of the still image section. Section 21 includes a feedback selector 22 and an output stage 35. As will be seen further hereinafter, output stage 35 has an input 36 connected to receive a voltage from the switched terminal of the inductor of the still image section, such as from the switched terminal of the primary inductor of transformer 19. Output stage 35 receives the input voltage and forms a video output voltage, or second output voltage, on output 49 of section 21. Input 36 receives the voltage from the switched terminal of the inductor as controller 17 switches the switch (SW) that is internal to controller 17. The voltage on input 36 is rectified by a diode 37 and the resulting average voltage is stored on an output capacitor 38 as a stored voltage on a node 39. Output stage 35 also includes an output voltage selector 41 that selectively couples the stored voltage from node 39 and capacitor 38 to output 49 as the video output voltage. A feedback network of section 21 includes a resistor 53 configured to form a second feedback signal or video feedback signal (VFB) that is representative of the video output voltage on output 49. Those skilled in the art will realize that other well-known feedback circuits may also be used to form the feedback signal.

A feedback selector 22 of section 21 is configured to receive the first feedback signal from node 14 that is representative of the output voltage formed on output 15 and to also receive the video feedback signal (VFB) that is representative of the video output voltage formed on output 49. Feedback selector 22 is configured to selectively couple the first feedback signal to the sense signal (SN) input of controller 17 in order to facilitate regulating the output voltage on output 15 to the target value for output 15 and to selectively couple the video feedback signal (VFB) to the sense signal (SN) input for regulating the video output voltage on output 49 to the target value for the video output voltage.

In operation, negating the video enable (VE) control signal, for example a logic low, forces the output of an inverter 25 of selector 22 high which enables a transistor 27. Enabling transistor 27 connects the feedback signal (FB) from node 14 to the sense signal input (SN) of controller 17. This allows controller 17 to control the value of current 16 in order to regulate the value of the output voltage on output 15 to the target value for output 15. The negated video enable (VE) control signal also disables a transistor 44 of selector 41 which allows resistor 47 to pull a base of a transistor 48 high thereby disabling transistor 48. Since transistor 48 is disabled, the stored voltage on node 39 is not applied to output 49. Therefore, selector 41 selectively inhibits the formation of an output voltage on output 49 responsively to a negated state of the VE signal. As a result, the value of the voltage on node 39 does not effect the operation of system 20 during this operating state.

Asserting the video enable (VE) control signal, for example a logic high, enables transistor 44 which pulls the base of transistor 48 low thereby enabling transistor 48. Enabling transistor 48 couples output 49 to the storage element of capacitor 38 thereby coupling the voltage stored thereon to output 49 and forming the video output voltage on output 49. The video output voltage on output 49 cause a current to flow through an LED 51 in order to generate light from LED 51. Current flowing through LED 51 also flows through resistor 53 which forms the video feedback signal (VFB) at a feedback node 54. The asserted video enable (VE) control signal also forces the output of inverter 25 low which disables transistor 27 and forces the output of buffer 24 high. The high from buffer 24 enables transistor 28 to selectively connect the video feedback signal (VFB) to the sense signal (SN) input of controller 17. This allows controller 17 to control the value of current 16 in order to regulate the value of the video output voltage on output 49 to the target value for the video output voltage.

In order to facilitate this functionality for system 20, node 14 is connected to a first feedback input of selector 22 and to a source of transistor 27. A drain of transistor 27 is commonly connected to a drain of transistor 28, an output of selector 22, and to the sense signal (as n) input of controller 17. Node 54 is connected to a second feedback input of selector 22 and to a source of transistor 28. A control input 23 of selector 22 is connected to an input of buffer 24 and an input of inverter 25. The output of buffer 24 is connected to the gate of transistor 28 and the output of inverter 25 is connected to the gate of transistor 27. Input 36 of output stage 35 is connected to an anode of diode 37 and to a switched terminal of the inductor of the still image section. The cathode of diode 37 is commonly connected to a first terminal of capacitor 38, the first terminal of resistor 47, and to an emitter of transistor 48. A second terminal of resistor 47 is commonly connected to the base of transistor 48 and a collector of transistor 44. An emitter of transistor 44 is commonly connected to a terminal of resistor 53, a second terminal of capacitor 38, and to return 12. The base of transistor 44 is connected to a first terminal of resistor 43 which has a second terminal connected to receive the video enable (VE) control signal on a video enable (VE) control signal terminal. The switching output of controller 17 is connected to the switched terminal of the primary inductor of transformer 19 and the non-switched terminal of the primary inductor is connected to receive power from a power input terminal 11. A secondary inductor of transformer 19 has a switching terminal connected to an anode of diode D1 which has a cathode connected to output 15. A non-switched terminal of the secondary inductor of transformer 19 is commonly connected to return terminal 12, the first terminal of capacitor C2, and a first terminal of resistor R3. A second terminal of capacitor C2 is connected to output 15 and to a first terminal of resistor R2. A second terminal of resistor R2 is connected to node 14 and to a second terminal of resistor R3.

Figure 3:
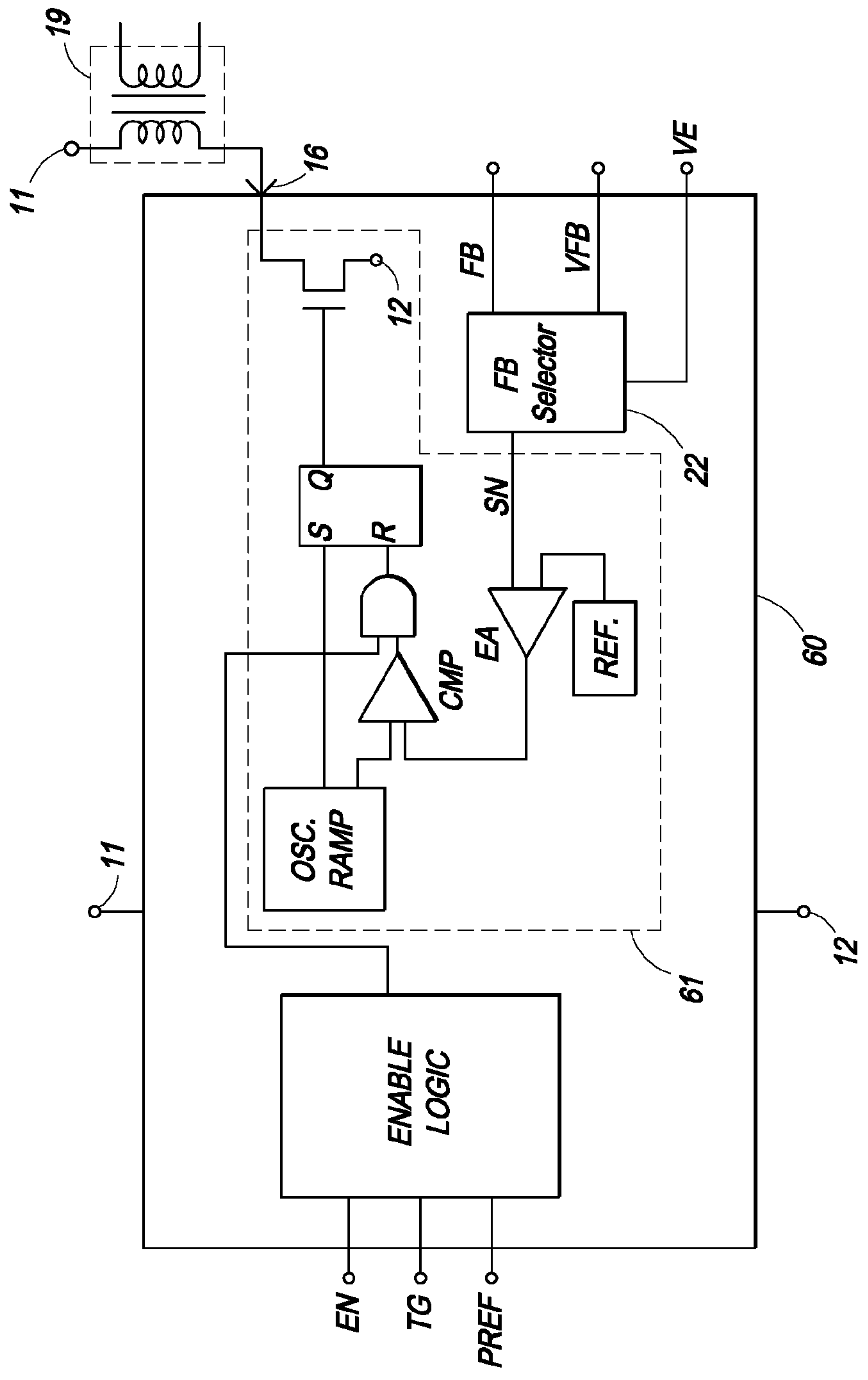
FIG. 3 schematically illustrates a simplified block diagram of a switching power supply controller in accordance with the present invention.

FIG. 3 schematically illustrates a simplified block diagram of a switching power supply controller 60 that is similar to controller 17 of FIG. 2 but that also includes feedback selector 22 that is explained in the description of FIG. 2. As is well known in the art, one example embodiment of a switching power supply controller usually includes an oscillator, a ramp generator, an error amplifier (EA) that receives the SN signal, a comparator that compares the error signal to the ramp signal, and a latch that is used to form a switching drive signal to operate the power switch and control the value of current 16. The elements of controller 60 may be integrated onto a single semiconductor substrate.

Figure 4:
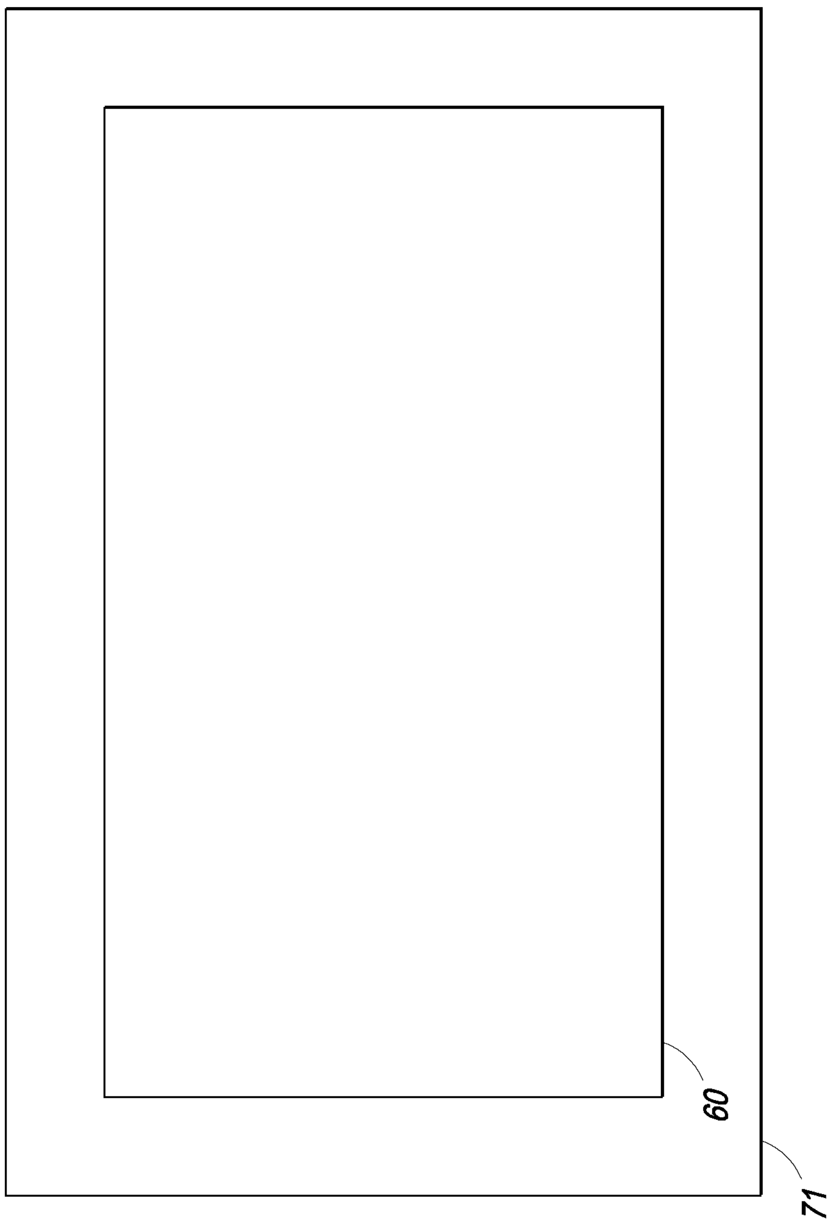
FIG. 4 illustrates an enlarged plan view of a semiconductor device that includes the power supply controller of FIG. 3 in accordance with the present invention.

FIG. 4 illustrates an enlarged plan view of a portion of an embodiment of a semiconductor device or integrated circuit 70 that is formed on a semiconductor die 71. Controller 60 is formed on die 71. Die 71 may also include other circuits that are not shown in FIG. 4 for simplicity of the drawing. Controller 60 and device or integrated circuit 70 are formed on die 71 by semiconductor manufacturing techniques that are well known to those skilled in the art.

One skilled in the art can understand from the proceeding explanations that a power supply system for an illumination source of a video capturing device may be configured to include: a switching power supply controller, such as controller (17), coupled to control a current, such as a current 16, through an inductor, for example an primary inductor of transformer 19, to regulate a first output voltage on a first output, such as output 15, to first desired value in response to a sense signal such a sense signal SN; a first output stage of the power supply system has a first storage element coupled to the first output to store the first output voltage, and also has a first feedback network configured to form a first feedback signal that is representative of the first output voltage;

a second output stage of the power supply system has an input coupled to receive a voltage from the inductor, a rectifier coupled to the input, a second output for forming a second output voltage, a second storage element coupled to receive a signal from the rectifier and store the second output voltage, and a second feedback network configured to form a second feedback signal that is representative of the second output voltage; and a feedback selector of the power supply system is configured to selectively couple the first feedback signal to the sense signal for regulating the first output voltage to the first desired value and not regulating the second output voltage to the second desired value, and to selectively couple the second feedback signal to the sense signal for regulating the second output voltage to the second desired value and not regulating the first output voltage to the first desired value.

One skilled in the art can also understand from the proceeding explanations that a method of forming a power supply controller can include; forming a switching power supply control section to form a drive signal for switching operating a switch to control a current through an inductor in response to a sense signal;

configuring the power supply controller to receive a first feedback signal that is representative of a first output voltage and to receive a second feedback signal that is representative of a second output voltage; and further can include forming a feedback selector of the power supply system to selectively couple the first feedback signal to the sense signal for operating the switch to control the current and regulate the first output voltage to a first desired value and not regulating the second output voltage, and to selectively couple the second feedback signal to the sense signal for operating the switch to control the current and regulate the second output voltage to a second desired value and not regulating the first output voltage to the first desired value.

In view of all of the above, it is evident that a novel device and method is disclosed. Included, among other features, is selectively coupling either a first feedback signal or a second feedback signal to a sense input of a switching power supply controller in order to regulate a respective first or second output voltage to a corresponding target value. Reusing a single power supply controller to regulate two different output voltages to two values including two different values reduces the number of switching power supply controllers and inductors that are required thereby reducing the cost.

While the subject matter of the invention is described with specific preferred embodiments, the foregoing drawings and descriptions thereof depict only typical and exemplary embodiments of the invention subject matter and are not therefore to be considered to be limiting of its scope, it is evident that many alternatives and variations will be apparent to those skilled in the art. System 20 and controller 60 are illustrated and explained as a leading edge fixed frequency switching buck power supply controller. However, the invention is applicable to other types of switching power supply systems including a boost system, a hysteretic system, a pulse frequency modulation system, and other well known switching control methods. Additionally, selector 22 is illustrated with a specific embodiment, however, other embodiments may also be used as long as the selector selects one feedback signal to be applied to controller from a plurality of feedback signals. Also, selector 35 is configured with a specific embodiment. The embodiment of selector 35 may be different as long as it forms an output voltage on output 49 responsively to the VFB signal being coupled to the switching power supply controller. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply system for an illumination source of a video capturing device:

a switching power supply controller coupled to control a current through a primary inductor of a transformer to regulate a first output voltage on a first output that is coupled to a secondary inductor of the transformer to a first target value in response to a sense signal;

a first output stage having a first storage element coupled to the first output to store the first output voltage, and having a first feedback network configured to form a first feedback signal that is representative of the first output voltage;

a second output stage having an input configured to receive a voltage from the primary inductor of the transformer, a rectifier coupled to the input, a second output for forming a second output voltage, a second storage element coupled to receive a signal from the rectifier and store a voltage, and a second feedback network configured to form a second feedback signal that is representative of the second output voltage; and a feedback selector configured to selectively couple the first feedback signal to the sense signal for regulating the first output voltage to the first target value and not regulating the second output voltage to a second target value, and to selectively couple the second feedback signal to the sense signal for regulating the second output voltage to the second target value and not regulating the first output voltage to the first target value.

2. The power supply system of claim 1 wherein the first output stage includes a second rectifier coupled to the secondary inductor of the transformer and coupled to the first output.

3. The power supply system of claim 1 wherein the rectifier is coupled between a switched terminal of the primary inductor and the second storage element.

4. The power supply system of claim 1 further including an output voltage selector configured to couple the second output to a load responsively to selectively coupling the second feedback signal to the sense signal.

5. The power supply system of claim 4 wherein the load is an LED.

6. The power supply system of claim 4 wherein the output voltage selector includes a switch configured to couple the second output to the load responsively to selectively coupling the second feedback signal to the sense signal.

7. The power supply system of claim 1 wherein the switching power supply controller includes a switch coupled to selectively conduct the current in response to a switching drive signal formed by the switching power supply controller.

8. The power supply system of claim 1 further including a second rectifier configured to be coupled to the first output and the first storage element.

9. A method of forming a power supply controller comprising:

forming a switching power supply control section to form a drive signal for switching operating a switch to control a current through a primary inductor of a transformer in response to a sense signal;

configuring the power supply controller to receive a first feedback signal that is representative of a first output voltage formed from a secondary inductor of the transformer and to receive a second feedback signal that is representative of a second output voltage formed from a voltage received from a switched terminal of the primary inductor of the transformer; and forming a feedback selector to selectively couple the first feedback signal to the sense signal for operating the switch to control the current and regulate the first output voltage to a first desired value and not regulating the second output voltage, and to selectively couple the second feedback signal to the sense signal for operating the switch to control the current and regulate the second output voltage to a second desired value and not regulating the first output voltage to the first desired value.

10. The method of claim 9 wherein forming the feedback selector includes coupling the power supply controller to provide the first and second output voltages for a video illumination system.

11. The method of claim 10 wherein coupling the power supply controller to provide the first and second output voltages includes coupling the power supply controller to provide the first output voltage for a flash illumination system and to provide the second output voltage for a continuous video illumination system.

12. The method of claim 9 further including;

configuring the first output stage to include a first rectifier coupled to a first output where the first output voltage is formed and coupled to a first storage element for storing the first output voltage.

13. The method of claim 9 wherein forming the feedback selector includes coupling a first selector switch to receive the first feedback signal and selectively couple the first feedback signal to the sense signal responsively to a first state of a select control signal, and coupling a second selector switch to receive the second feedback signal and selectively couple the second feedback signal to the sense signal and decouple the first feedback signal from the sense signal responsively to a second state of the select control signal.

14. A method of forming a power supply controller comprising:

forming a switching power supply control section to form a drive signal for switchingly operating a switch to control a current through an inductor in response to a sense signal wherein the inductor is a primary inductor of a transformer and wherein the transformer includes a secondary inductor configured for coupling to a first output stage;

configuring the first output stage to include a first rectifier coupled to a first output where a first output voltage is formed and coupled to a first storage element for storing the first output voltage;

configuring the power supply controller to receive a first feedback signal that is representative of the first output voltage and to receive a second feedback signal that is representative of a second output voltage; and forming a feedback selector to selectively couple the first feedback signal to the sense signal for operating the switch to control the current and regulate the first output voltage to a first desired value and not regulating the second output voltage, and to selectively couple the second feedback signal to the sense signal for operating the switch to control the current and regulate the second output voltage to a second desired value and not regulating the first output voltage to the first desired value; and coupling the primary inductor to a second output stage including a second rectifier, and coupling the second rectifier to a second output where the second output voltage is formed and to a second storage element for storing the second output voltage.

15. The method of claim 14 wherein coupling the primary inductor to the second output stage includes coupling an output selector switch to couple the second output voltage to the second output responsively to coupling the second feedback signal to the sense signal.

* * * * *